Feb. 28, 1956  J. JORDI  2,736,416
COPYING DEVICE FOR BOOKKEEPING MACHINES
Filed Jan. 12, 1950  3 Sheets-Sheet 1
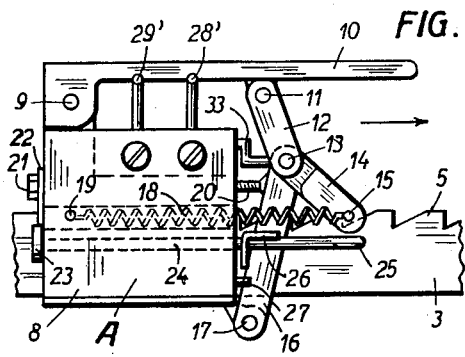
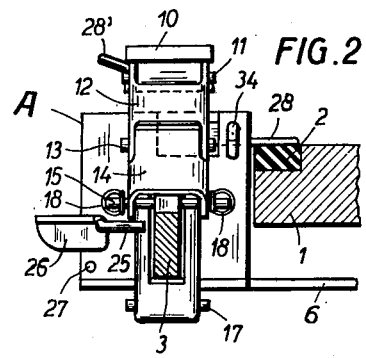
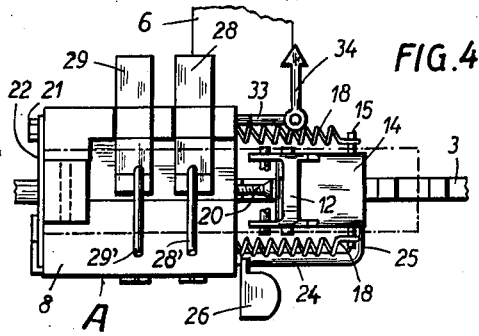
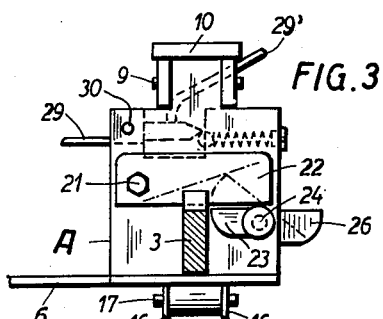
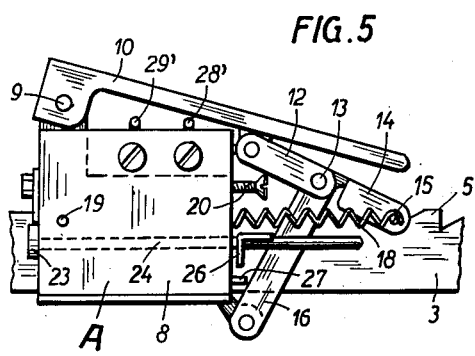
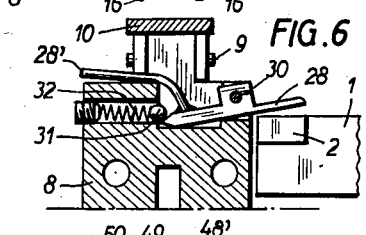
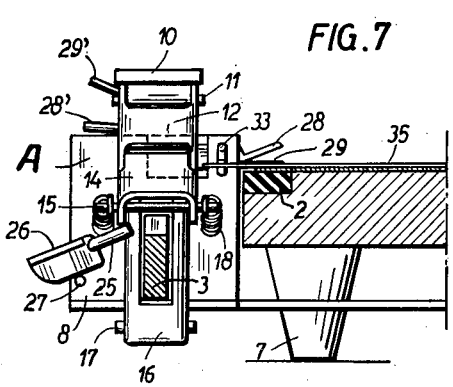
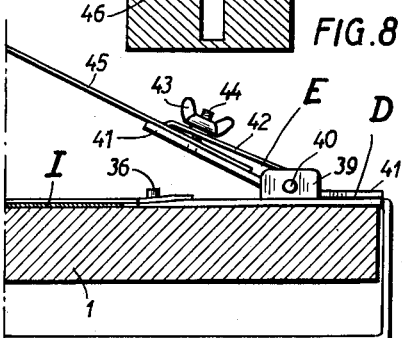
INVENTOR:
Jakob Jordi
by Sommers & Young
Attorneys INVENTOR:
Jakob Jordi
by Sommers + Young
Attorneys Feb. 28, 1956 J. JORDI 2,736,416
COPYING DEVICE FOR BOOKKEEPING MACHINES
Filed Jan. 12, 1950 3 Sheets-Sheet 3
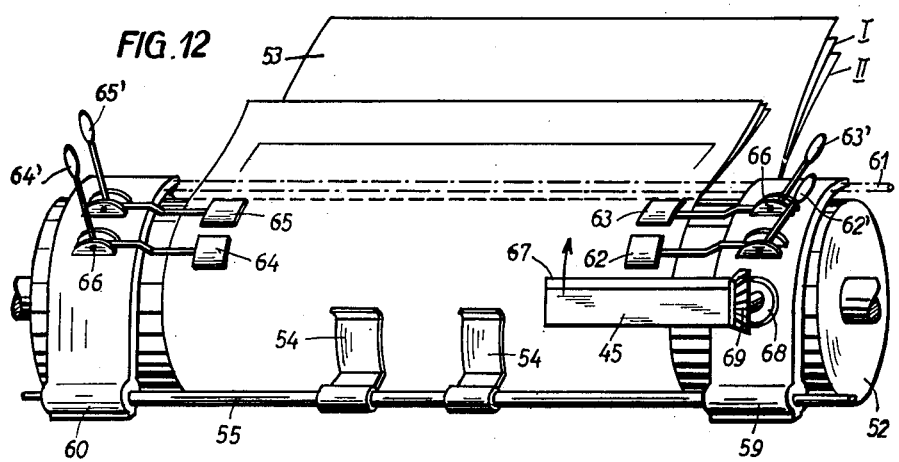
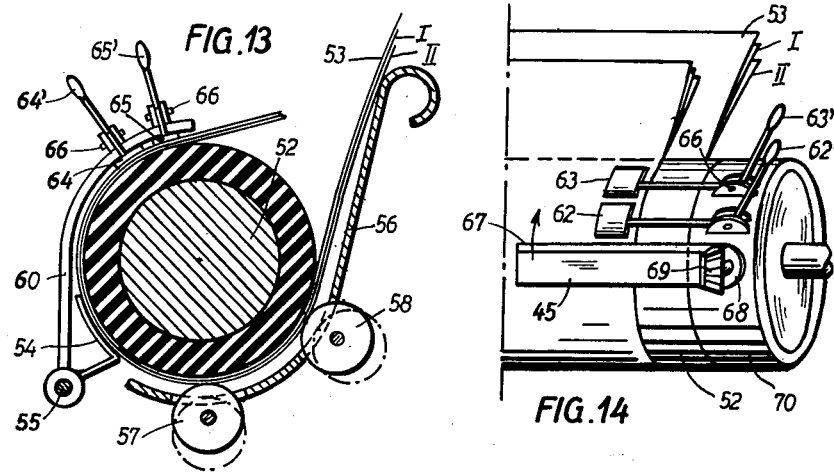
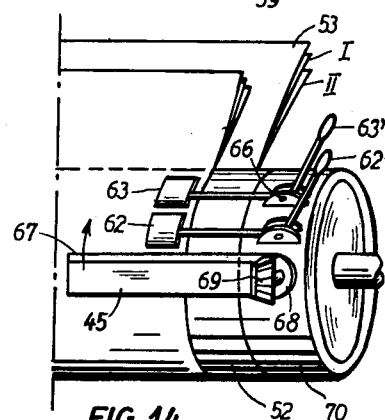
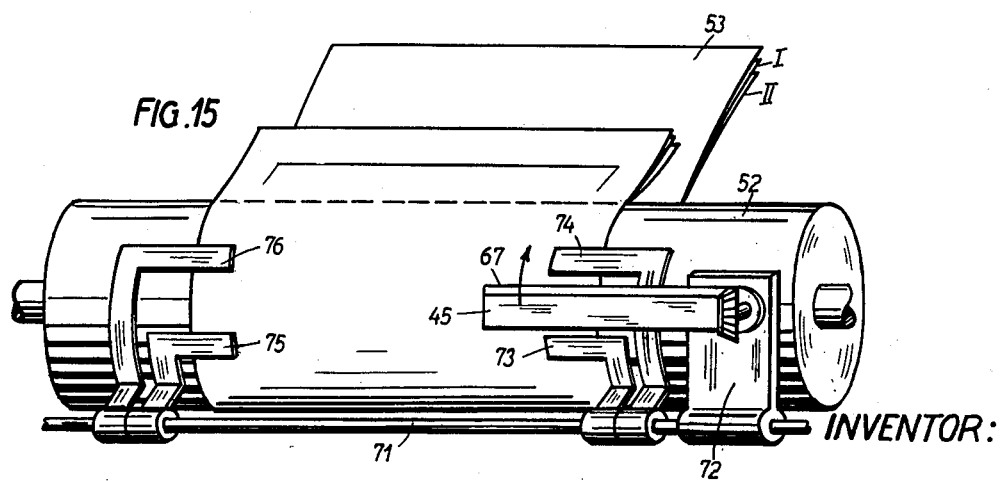
INVENTOR:
Jakob Jordi
by Sommers & Young
Attorneys

United States Patent Office 2,736,416
Patented Feb. 28, 1956

2,736,416

COPYING DEVICE FOR BOOKKEEPING MACHINES

Jakob Jordi, Zurich, Switzerland

Application January 12, 1950, Serial No. 138,193

Claims priority, application Switzerland February 8, 1949

3 Claims. (Cl. 197—126)

My present invention relates to improvements in copying devices for bookkeeping machines, which utilize loose-leaf copies. The organization disclosed in the following description is characterized by a support or platen for a daybook leaf, means for holding down a first copying ribbon or tape disposed transversely of the columns on the daybook leaf, and means for holding down a second copying ribbon or tape; such second means being movable so as to permit the second ribbon to be brought as required within or outside the range of the first copying ribbon, the second copying ribbon extending only over certain columns of the daybook leaf and serving for copying when using two entry leaves put on the daybook leaf, which entry leaves are locatable by corresponding auxiliary means; and further by means which permit a relative line-by-line displacement between the daybook leaf on one hand and the two copying ribbons on the other hand.

A particularly simple form of invention is afforded, for example, when as a support a board is used which comprises a guideway along one edge thereof, on which guideway a part of the first means for holding down the first copying ribbon is displaceable line-by-line, the said part being rigidly secured to a second part which is disposed on the opposite edge of said board and carries the second means for holding down the second copying ribbon. The said second means is pivotable, and the guideway preferably is constituted by a rod which receives the first means for holding down the first copying ribbon (which first means is formed as a slide), said first means suitably comprising auxiliary means for locating a plurality of entry leaves.

The mechanical organization disclosed in the following specification is based on a special type of bookkeeping which involves a special column subdivision of the daybook leaf as set forth in the following pages.

Several forms of my present invention are shown in the accompanying drawings, in which—

Figure 9:
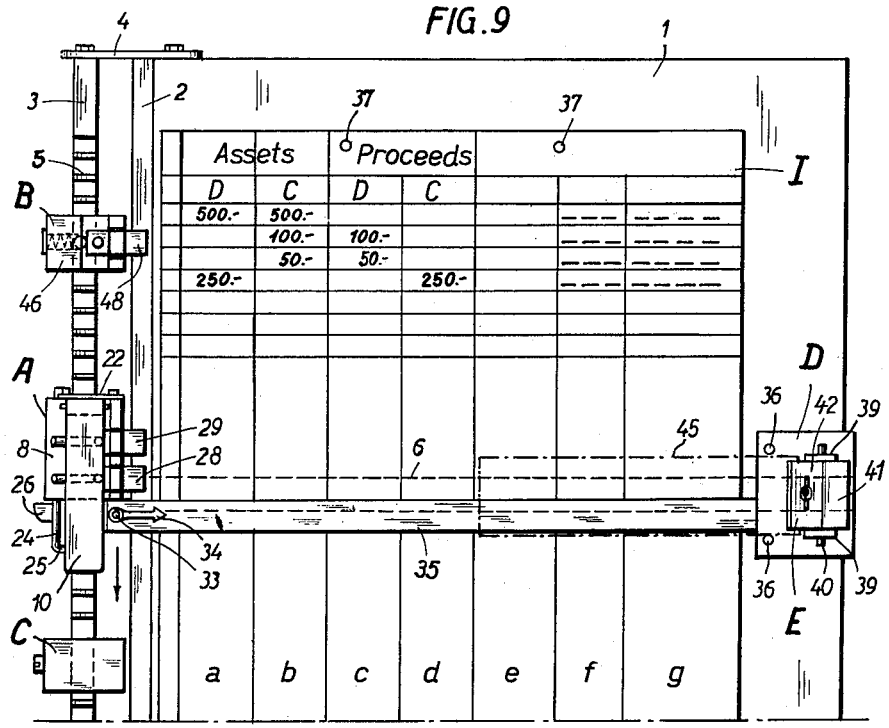
Figure 10:
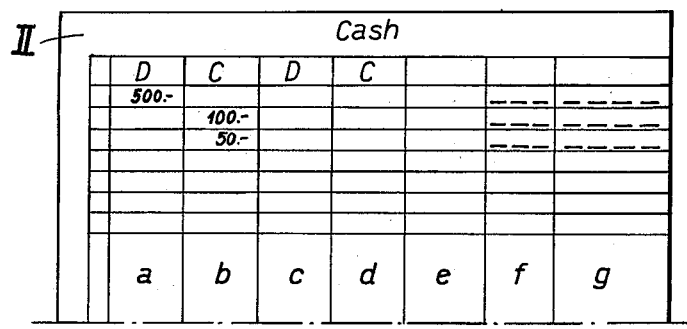
Figure 11:
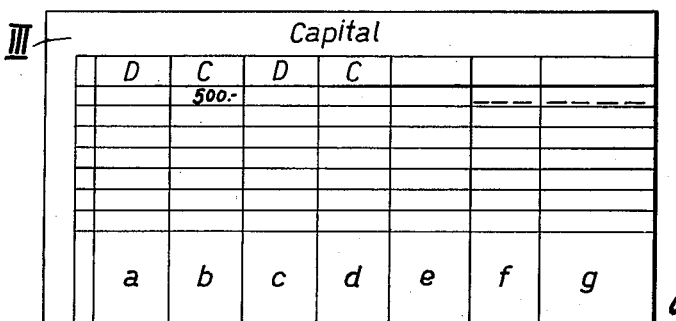

Fig. 1 shows part of the first form in elevation, involving a holding down means A which is displaceable line-by-line and is disposed on a board serving as a support, Fig. 2 is an end view of said means A, as seen from the right in Fig. 1, the guide rod and the board being shown in section, Fig. 3 is an end view from the left of Fig. 1, Fig. 4 is a top plan view of Fig. 1, Fig. 5 is an elevation of means A, similar to Fig. 1, but showing a different position of an operating lever, Fig. 6 is a cross-section through means A, Fig. 7 is a view similar to Fig. 2, but supplemented by further parts, Fig. 8 is a cross-section through a second holding down means disposed on the guide rod, Fig. 9 is a top plan view of the board together with accessory parts and a daybook leaf I laid thereon, Figs. 10 and 11 each show further entry leaves II and III respectively;

Fig. 12 is a perspective view of a second form in which a platen is used for support, Fig. 13 is a cross-section of Fig. 12, Fig. 14 is a partial view corresponding to Fig. 12, involving a modified detail, and Fig. 15 is a perspective view of a further form of the invention.

In the first example (Figs. 1–11) the support or board is designated by 1 and is rectangular as shown in Fig. 9. The board 1 is only partly shown and is provided along one edge with an adhesion-augmenting strip inset 2 of resistant and hard material. A rack bar 3, arranged on edge, is spaced from said strip 2 and parallel thereto and at its ends is rigidly connected to the board 1 by brackets 4. The bar 3 on top is provided with teeth 5 and serves for guiding the two holding down means A and B, which are formed as slides, and a body C (Fig. 9). Besides the latter, the means A and B also serve as leaf stops. At the opposite edge of board 1 there is disposed a counter holder D (Figs. 7, 9) which is rigidly connected to means A through a rod 6 (Fig. 7) which passes underneath the board 1. Legs 7 fixed to the latter serve for supporting the organization on a desk or table top. A pivotable holding down means E is disposed on the holder D.

To slide 8 of means A an operating lever 10 (shown by dash-and-dot lines in Fig. 4) is pivoted on a pin 9 for stepwise movement of slide 8 on bar 3 in the direction of the arrow shown in Figs. 1 and 9, in accordance with the tooth pitch of rack bar 3 which is representative of the line spacing provided on the entry leaves. An arm 12 at one end is pivoted on a pin 11 to lever 10, and at the other end on a pin 13 to a pawl 14. The latter engages the teeth 5 of rack bar 3 through a stud 15 on which a roller is mounted. Arm 12 and pawl 14 are each made of a U-shaped sheet iron strip, of which the web is cut away at the end portions of arm 12 (Figs. 2, 4, 7). Pawl 14 is narrowed down in the range of arm 12 so as to fit through its web between the legs of arm 12. The said web forms a boss for pin 13. A further arm 16 also is made of a channel shape sheet iron piece. Arm 16 at one end is pivoted on pin 13 and at the other end on a pin 17 to slide 8, and its web is recessed for the passage of rack bar 3. A spring 18 engages each end of stud 15 traversing pawl 14, and partly is situated in a bore of slide 8. The other ends of the springs 18 are anchored to a stud 19 of slide 8. At one end of slide 8 there is mounted a stop screw 20 for arm 16. A latching plate 22 is pivoted on a pin 21 to the other end of slide 8 and normally engages the teeth 5 of rack bar 3 by gravity. Said plate 22 is associated with a trip arm 23 which at one end is fixed to a pin 24 which traverses a bore in slide 8, and at the other end is bent over to form a stop arm 25. Spaced from the latter there is provided on pin 24 a finger grip 26 cantilevered to the opposite side, and a stop 27 for grip 26 is secured to slide 8.

For the purpose of moving the holdingdown means A step-by-step, the operating lever 10 is depressed from the position of rest shown in Fig. 1 to the position shown in Fig. 5. Pawl 14 thus is displaced through the lever 12 and arm 16 by one tooth on the rack bar 3, while the two springs 18 are further tensioned. Pawl 14 by means of its propping stud 15 or the roller thereon, slides over the inclined face of the respective tooth of rack bar 3, the latching plate 22 (which abuts against the vertical breast of a tooth of said rack bar) preventing a displacement of slide 8 in the direction opposite to the arrow shown in Fig. 1. After the pawl 14 has performed its step (defined by the pitch of the teeth 5), its stud 15 again is located in a tooth gap and on the vertical breast of the respective tooth of rack bar 3. The operating lever 10 then is released, and the slide 8 is pulled along by the springs 18 in the direction of the arrow shown in Fig. 1 through one intertooth space. At the same time, the linkage 10, 12, 14 and 16 is moved back into the initial position (Fig. 1). The stepwise movement of slide 8 then may be repeated. The return movement of arm 16 is limited by the abutment screw 20 provided on slide 8, which screw permits accurate regulation of the extent of the stepwise movement. When moving the slide 8, the click or latch plate 22 passes over the inclined face of the respective tooth of rack bar 3 (Fig. 9) to drop into the succeeding tooth gap of the teeth 5. When it is required to move the slide 8 on rack bar 3 in the opposite sense of the normal or forward movement thereof (such normal movement being indicated in Figs. 1 and 9 by an arrow), the pin 24 mounted on slide 8 is rotated by depressing its grip 26 so that the trip arm 23 moves the plate 22 away from the teeth 5 of rack bar 3 and the stop arm 25 as shown in Fig. 7 abuts against the pawl 14 and raises the latter to such extent that the stud 15 thereof is disengaged from the teeth 5. In Fig. 5, such condition is indicated by dash-and-dot lines. The slide 8 now is entirely disengaged from the rack bar 3 and may be longitudinally displaced thereon as desired by means of the grip 26. After the slide 8 has been moved along the rack bar 3 to the position desired, the grip is released, whereupon the pin 24 is rotated backwardly under the influence of the springs 18 and the catch plate 22 again becomes effective on the teeth 5 of rack bar 3.

Two clamping levers 28 and 29 are pivoted to the slide 8 on a common pin 30 (Fig. 6) and transversely of the path of the slide 8 or means A. Each clamping lever has a handle 28' and 29', respectively, and co-acts with a locking ball 31 which in a bore of slide 8 is pressed through a spring 32 against the ends of said levers, which ends are formed as double wedges. In the operative position, each said lever co-acts with the adhesion strip 2 in the sense of Fig. 2 so as to locate the leaves. On depressing the operating lever 10, the latter through the handles 28' and 29' causes the two levers 28 and 29 to swing clear of strip 2 on board 1, as indicated in Fig. 6, and the operator now may put on entry leaves as required. The two levers 28 and 29 may be operated individually if desired. In the two setting positions of said levers, the individual lever is secured by means of the locking ball 31 which acts on the respective wedge of the lever.

A cantilever 33 bent at right angles at a plurality of points along its length is secured to the slide 8 and carries a pointer 34 (Figs. 4 and 9) as well as a carbon-paper tape 35 (by means of a reinforcing part not shown) at one end. The tightly stretched carbon-paper tape 35 at its other end is located (by means of a reinforcing part not shown) on two studs 36 provided on the counter-holder D. The said tape may be replaced as desired. The pointer 34 indicates the position of said tape 35 with respect to the lines of writing of daybook leaf I which is underneath the tape 35 and put directly on the board 1. The daybook leaf I by means of holes therein is put in two studs 37 secured to board 1, as shown in Fig. 9.

Two vertical lugs 39 are secured to the counterholder D and a swing plate 41 is pivoted thereto on a pin 40. The plate 41 belongs to a holder E which further comprises a clamping plate 42. The latter may be clamped down to plate 41 by means of a wing nut 43 engaged with a stud 44. The plate 42 within the range of the bearing pin 40 is so connected to swing plate 41 that it follows the latter's pivoting movements. A carbon-paper tape 45 is replaceably located between the plates 41 and 42 of holder E by means of a carrier and reinforcing member (not shown). The tape 45 lies on top of the carbon-paper tape 35 when the holder E has been swung down towards the board 1, but is of shorter length than the tape 35. When the holdingdown means A is displaced, the counterholder D, being fixed thereto, follows the same, as does also the holder E which is carried by the counterholder D, and also the two carbon-paper tapes 35 and 45.

A holdingdown means B (Figs. 8 and 9) is mounted on the rack bar 3 and comprises a slide 46 to which is pivoted a clamping lever 48 on a pin 47. The lever 48 is disposed at right angles to the rack bar 3 and co-acts with a catch ball 49 which is loaded by a spring 50 (disposed in a bore provided on the slide 46) to engage the tapered end of lever 48. In the operative position, the lever 48 is held down against the adhesion strip 2 inserted in board 1, in order to serve as leafholder. By depressing the knob 48', the lever 48 may be swung from the operative into the inoperative position in which it is clear of said strip 2. By correspondingly actuating the lever 48, it may again be swung back into the operative position. In both these positions the lever 48 is secured by means of the catch ball 49 in that the latter engages the upper or lower skew face of the tapered end of lever 48.

The following description deals with the manipulation of the organization described in that first reference is had to the fact that the entry leaves II and III in Figs. 10 and 11 each represented an account leaf. The daybook leaf I is subdivided into columns a—g, while the account leaves II and III have corresponding columns. The columns a and c are for debits, and the columns b and d for credits. The column e is for noting rebates, and the columns f and g are for the insertion of account designations and the like. On the daybook leaf I the twin columns a, b and c, d are inscribed with "assets" and "proceeds" respectively, and serve for putting up the asset-and-proceed account. The kind and number of the columns are dependent on the purpose for which the leaves shall be used.

It is assumed that the first entry in the leaf II (which is designated as "cash" account) concerns a receipt of $500.00. The leaf II then is laid onto the daybook leaf I so as to register therewith line for line, the leaf I being located on the board 1. Prior to such mounting, the carbon-paper tape 35 disposed above the leaf I has been so adjusted, by correspondingly adjusting the holdingdown means on the rack bar 3, that it covers the first line of the daybook leaf I. The leaf II which has been laid laterally against the parts A, B and C, or which has been put into the required position, is clamped down onto the board 1 by means of either or both of the clamping levers 28, 29 provided on the means A, and thus located in its proper position. The clamping lever not used then is in the raised or inactive position. An entry of $500.00 now is made in column a on the first line of leaf II, and such entry is copied onto the leaf I through the carbon-paper tape 35. It further is assumed that a counter-entry of $500.00 shall be made in the leaf III (which is inscribed with "capital") in the first line in column b, for which purpose the said leaf III is put laterally up against the parts A, B and C or put on the leaf II as required, respectively, and located in its correct position on the board I by means of the clamping lever 28 or 29 which is still available. As required, a counter-entry of $500.00 is made on the leaf III. Such entry is copied onto the leaf I through the carbon-paper tape 35, but no such copying is done onto the leaf II which is situated immediately underneath the leaf III. Let it be further assumed that entries yet have to be made on the leaf III, for example in the columns f and g, which entries also shall be made in leaf II besides in leaf I. For such purpose, the carbon-paper tape 45 (which so far has been held out of writing range by means of a corresponding adjustment of the pivotable holder E) is brought within writing range in that, after temporarily raising the leaf III on the respective margin, the holder E is swung against the board 1 so that the tape 45 will be situated between the leaves II and III. Tape 45 (which in Fig. 9 is indicated by dash-and-dot lines only) then is situated within range of tape 35, but only extends across the columns e—g of the leaves I—III, while tape 35 spans all the columns $a$—$g$ of leaf I. The necessary entries then are made in the columns $f$ and $g$ on the leaf III, which are copied in order through the tapes 45 and 35 onto the leaf II and the leaf I. The said entries are indicated in the drawing by dotted lines.

The account leaves then are exchanged. By depressing the operating lever 10, the clamping levers 28 and 29 are slackened; i. e. raised off the adhesion strip 2 so as to release the leaves II and III. The holdingdown means A is advanced on the rack bar 3 by one step by temporarily depressing the operating lever 10 so as to bring the tapes 45 and 35 within the range of the second line of leaf I. The leaf II again is laid onto leaf I and positively located by means of the holder A in the manner described, whereupon an entry of $100.00 is made on said leaf II and copied in order onto the leaf I. When, for example, entries have to be made consecutively in a plurality of lines in leaf II or in any other account leaf, such leaf is located on the board 1 by means of the clamping lever 48 provided on the holdingdown means B, whereupon the holdingdown means A provided with the two clamping levers 28 and 29 may be displaced stepwise on the rack bar 3 as required. The parts B and C are manually displaceable along the rack bar 3 and remain in their setting position with the aid of locking means (not shown) engaging the rack bar 3.

The expense item of $100.00 now is entered on the goods-purchasing sheet (not shown and which may be designated by IV). The latter is put on the leaf II line for line by means of either clamping lever 28 or 29 which still is available. The tape 45 is brought between leaves II and IV, and the item of $100.00 is entered into column $c$. The necessary annotation is entered on leaf IV in the columns $e$—$g$ and copied onto the leaves II and I.

The operating lever 10 then is depressed again, the holdingdown means A is advanced by one step, the clamping levers 28 and 29 again are raised off the adhesion strip 2, and the two leaves II and IV are released for exchange. Let it be assumed that an expense item of $50.00, for example, for purchasing office stationery, has to be entered on a further leaf (which may be designated as leaf V). The previously inscribed leaf IV then is removed from the board 1. On the latter there remains the leaf II on which the item of $50.00 is entered on the third line in column $b$, which item is copied through the tape 35 onto the leaf I. The leaf V (which, for example, may be marked "expenses") is laid onto the leaf II and located thereon by means of one clamping lever (28 or 29) of the means A. The item of $50.00 then is entered as required on said leaf V so that it will appear on leaf I of the third line in column $c$. The necessary additional remarks are entered with the aid of copying tape 45 in the columns $e$—$g$.

As will be readily seen, the book-keeping system described, wherein the debit items and the credit items are separately entered in the same line, advantageously affords the possibility of surveying at any one time the total earnings and the total assets. The designation "daybook leaf" is intended to comprise any kind of booking leaf on which summary bookings have to be entered.

The organization according to my present invention may be varied in its details. Various solutions, e. g., are possible as regards the means for stepwise advancing the holder A. It also is imaginable to construct the organizations so that the book-keeping leaves, instead of the tapes 35 and 45, are displaced line for line. The tape 35, which is longer than the tape 45, also could be replaced by a copying ribbon adapted for copying on one side only, i. e. the underside. If desired, the tape 45 may be replaced by a sheet of carbon paper, by means of which the columns $e$—$g$ on the leaves shown may be covered.

For the examples now to be described (Figs. 12—15), only those parts and portions are shown which are required for explaining the invention. The board 1 of the former example is replaced by a platen 52 belonging to a typewriter or similar office machine, and the ink ribbon of which (running over a holding roll and a counter roll) extends across the columns of the daybook leaf I mounted on the platen 52. The daybook leaf is translucent and laid on a carbon-paper leaf 53 so that the latter's copying side faces the leaf I, i. e. the non-copying side of leaf 53 faces the platen 52. An entry leaf II and a carbon-paper strip 45 also are used in these examples, the strip 45 extending only across certain of the columns of leaf I. In these examples the writing on the entry leaves as well as the copying is done by means of the type levers of the office writing machine.

In the example according to Figs. 12 and 13, two press-fingers 54 serving as leaf holders are pivoted on a pin 55 and held resiliently against the platen 52 by means of torsional springs (not shown). Numeral 56 designates a leaf-guide means, while 57 and 58 represent leaf-engaging and leaf-feeding rollers. The latter in known manner are pivotable from a common axle by means of spring-loaded supporting levers (not shown) so that they may be moved as required from the operative position into the ineffective position shown by dots-and-dashes, or vice versa. On the pin 55 two partly arcuate carriers 59 and 60 are mounted with their lower ends, each of which is disposed in the range of one end portion of the platen 52 (the latter is actually longer than shown in Fig. 12). The upper ends of the two carriers are secured to a connecting pin 61. The latter and the pin 55 are parallel to each other and detachably mounted on the platen-carriage frame (not shown) so that the auxiliary device formed by the said parts 61 and 55 and their accessories may be withdrawn as a structural unit from said carriage and replaced therein again as desired. The said auxiliary device also may be mounted on existing business machines. Two pairs of holdingdown or clamping levers 62, 63 and 64, 65 are pivotally mounted at 66 each to the upper portion of the carriers 59 and 60 respectively. The said levers co-act with the platen 52 and serve as leaf holders (engaging the right and left leaf margin respectively) and may be moved against spring action individually by means of handles 62', 63' and 64', 65' from the operative position, shown in the drawing, into the inoperative position, and vice versa. In the latter position, the clamping levers 62—65 are swung away from the platen 52. Locking means (not shown) secure the said levers in position.

The carbon-paper strip 45 is disposed in a holder 67 which at 68 is mounted on the carrier 59 and which by means of a handle 69 may be swung upwardly from the operative position shown in Fig. 12 into the non-operative position and vice versa. In the operation position, the carbon-paper strip 45 is in the range of the carbon leaf 53 and of the ink ribbon, namely for the case when also an entry leaf III laid onto the leaf II and on top of the carbon-paper strip 45 is to be inscribed upon. In non-operative position, the strip 45 is outside the range of the entry leaves. The holder 67 is secured in position with the aid of automatically effective locking means.

By virtue of the stepwise rotation of the platen 52 as is customary in typewriting, the leaves located on the platen are displaced line-for-line with respect to the ink ribbon disposed in front of the said leaves and also with respect to the holder 67 of strip 45 and, thus, with respect to the operative position of the latter itself. Means such as are known for use with business machines for mounting entry leaves in front of a base leaf disposed in the machine, are used in the present example for inserting the entry leaves into the machine in correct line relation with respect to the clamped-down daybook leaf.

The manipulation of the auxiliary means described for the purpose of making entries is readily understood on the basis of the explanations given above for the first example.

The embodiment shown in Fig. 14 differs from that described immediately above in that the hard-rubber jacket on the end portions of platen 52 is replaced by rings 70, which are loosely mounted on the platen body. The said rings are secured against rotation by locking means (not shown) so that the platen 52 is rotatable by itself, i. e. without entraining the rings 70. Each of the latter carries the respective pair of clamping levers 62, 63 and 64, 65 respectively. The pivotable holder 67 of the carbon-paper strip 45 is disposed on the ring 70 shown in Fig. 14.

If desired, the two rings 70 may be rigidly interconnected by means of a rod. In such latter construction in particular, measures could be provided to permit the two rings 70 to rotate on the platen body within certain limits after tripping the said locking means, in such manner that the holder 67 and thus the strip 45 could be moved outside the operative range of the writing zone. In such case, the said holder 67 need not be pivotably mounted.

In the example set forth in Fig. 15, a rod 71 is disposed on the machine carriage and carries on an arm 72 the pivotable holder 67 for the carbon-paper strip 45. Two pairs of clamping levers 73, 74 and 75, 76 are pivotably mounted at their lower ends on the rod 71 and in cooperation with the platen 52 serve as leaf holders. The levers 73—76 are pressed against the platen 52 through torsional springs (not shown) and may be individually swung out of their operative position. If desired, the said levers may be disposed on an upper rod, instead of a lower rod, for the purpose of replacing entry leaves.

The said two pairs of clamping levers could be disposed immediately on the carriage frame, and also the movable holder of the strip 45.

What I claim as new and desire to secure by Letters Patent is:

1. A copying device for use with loose leaf book-keeping sheets, all of which have the same width and are provided with columns which lie one over the other, comprising a rigid platen, a copying strip arranged to lie above one of said book-keeping sheets and extending the entire width of all of the columns of said sheet so as to provide for copying in all of its columns, an additional copying strip which is not folded throughout its extent, a shaft mounted adjacent the right hand side of said platen, a holder for said additional copying strip, said holder being swingably mounted upon said shaft so as to swing said additional copying strip out of neutral position into the position for use in which it extends from right to left over only a part of the columns of the book-keeping sheets, and a shifting device for executing line-by-line relative movement between said book-keeping sheets and said copying strip and additional copy strip.

2. A copying device for use with loose leaf book-keeping sheets having the same width and the columns of which lie one over the other, comprising a rigid platen, means for holding a journal sheet on said platen, a displaceable holder on the left-hand edge of said platen, a step-by-step shift device for moving said holder a line at a time, a counter holder rigidly connected with said holder and located at the right-hand edge of said platen, said holder and counter holder being provided with a transversely extending copying strip for recording in all the columns of the journal sheet, a short auxiliary copying strip adapted to extend across certain columns only of a book-keeping sheet overlying the journal sheet, and a holder for said auxiliary copying strip mounted on said counter holder for swinging movement from a neutral position to an operative position wherein said auxiliary copying strip extends across said certain columns only of said overlying book-keeping sheet.

3. A copying device according to claim 1 in which the platen is the roller of an office typewriter, in which the ink ribbon of the typewriter serves as the copying strip for writing in all the book-keeping columns, and in which the shaft upon which the holder for the additional copying strip is swingably mounted is arranged cross-wise to the typewriter roller on the typewriter paper carriage.

References Cited in the file of this patent

UNITED STATES PATENTS

| | | |
|---|---|---|
| 1,209,218 | Smith | Dec. 19, 1916 |
| 1,228,896 | Foothorap | June 5, 1917 |
| 1,558,198 | Michelsen | Oct. 20, 1925 |
| 2,011,104 | Gillson | Aug. 13, 1935 |